United States Patent [19]

Le Guen et al.

[11] Patent Number: 5,663,960
[45] Date of Patent: Sep. 2, 1997

[54] CHAINING ARRANGEMENT BETWEEN INTERMEDIATE MODULES, PARTICULARLY OF REPEATER TYPE, OF AN INSTALLATION PROVIDED WITH TERMINALS COMMUNICATING VIA A PACKETS TRANSMISSION LINK, AND AN INSTALLATION THUS EQUIPPED

[75] Inventors: Marie-Pierre Le Guen, Brest; Raphaël Roux, Argenteuil; Philippe Kersale; Pascal Le Page, both of Brest, all of France

[73] Assignee: Alcatel N.V., Rijswijk, Netherlands

[21] Appl. No.: 577,145

[22] Filed: Dec. 22, 1995

[30] Foreign Application Priority Data

Dec. 28, 1994 [FR] France ............................. 94 15789

[51] Int. Cl.[6] .......................... H04L 12/26; H04L 12/44; H04L 12/46
[52] U.S. Cl. .................. 370/408; 370/438; 370/447; 370/501; 370/462; 370/463; 370/445
[58] Field of Search ................... 370/85.11, 85.13, 370/94.1, 56, 60, 60.1, 80, 85.1, 85.2, 85.3, 85.6, 85.9, 94.2, 94.3, 97, 408, 419, 438, 447, 501, 462, 463, 445, 400, 426; 371/20.5

[56] References Cited

U.S. PATENT DOCUMENTS

| | | | |
|---|---|---|---|
| 4,692,918 | 9/1987 | Elliott et al. | 370/85.11 |
| 5,251,203 | 10/1993 | Thompson | 370/85.3 |
| 5,483,230 | 1/1996 | Mueller | 370/85.11 |

FOREIGN PATENT DOCUMENTS

0495575A1 7/1992 European Pat. Off. .

*Primary Examiner*—Douglas W. Olms
*Assistant Examiner*—Ajit Patel
*Attorney, Agent, or Firm*—Sughrue, Mion, Zinn, Macpeak & Seas

[57] ABSTRACT

A chaining arrangement between intermediate modules (14), particularly of the repeater type, servicing transceiver terminals (0) communicating via a common, digital, packet transmission link (LP), in a communications installation. Each module has an access monitoring signal input (acki) linked to the output of a first individual concentrator logical circuit (15), this circuit including "p" inputs each capable of being linked to an access monitoring signal output (acko) of "p" different modules. Each module has its access monitoring signal output linked to a scattering circuit (16) making it possible to simultaneously drive the access monitoring signal inputs of "p" different modules.

6 Claims, 2 Drawing Sheets

CHAINING ARRANGEMENT BETWEEN INTERMEDIATE MODULES, PARTICULARLY OF REPEATER TYPE, OF AN INSTALLATION PROVIDED WITH TERMINALS COMMUNICATING VIA A PACKETS TRANSMISSION LINK, AND AN INSTALLATION THUS EQUIPPED

BACKGROUND OF THE INVENTION

1. Field of the Invention

The invention concerns the chaining arrangements between intermediate modules, particularly of repeater type, for a communications installation including transceiver terminals communicating by means of a common packet transmission link to which they are linked via the modules. It also concerns the communications installations equipped with such arrangements.

2. Description of the Prior Art

There are many communications installations including transceiver terminals which communicate with each other by means of a common packet transmission link which they utilize on a time-shared basis, each transmitting according to its requirements, when the link is available. These installations typically include intermediate modules responsible for connection operations for one or more transceiver terminals to which they are assigned.

For various reasons, and particularly for reasons of cost, these modules often have a concentration function and are therefore shared by several transceiver terminals. In addition, these modules often further ensure a standardization of the signals transmitted between a transmitting terminal and a receiving terminal by regenerating these signals so that they are always comprised within given admissible limits.

There are modules referred to as repeaters which are achieved so as to ensure such functions in the case of common packet transmission links such as those considered above, particularly in the case of the links provided to achieve local networks, such a standard type network, for example.

To fully profit from the transmission possibilities offered by a common link shared in this manner within the scope of a single installation, it is known to control the unit which is formed by the modules and the common link to which they are connected via an auxiliary network of control links linked to the modules. In a known embodiment, each module includes an input provided to receive an access monitoring blocking signal, of binary type, indicating whether the common link is accessible to it or not and whether it can thus utilize it to transmit data coming from a transceiver terminal to which it is associated. Each module also includes an output to transmit the access monitoring signal, when it itself wishes to access the common link so as to transmit from it.

It is therefore known to handle the access problems of modules of this type connected to a common packets transmission link through the serial chaining of the modules which is obtained by linking the access monitoring signal output of one module to the access monitoring signal input of another located downstream, and so forth, starting from a first one amongst them. The latter practically has priority when it wishes to transmit, when a transmission is not already in progress, it being understood that any module is fit for determining whether there is a transmission in progress on the common transmission link, any transmission being on principle transmitted by the common link towards all of the modules linked to it.

This solution makes it possible to achieve the auxiliary network of control links in a simple manner, since a single control link is sufficient to link the access monitoring signal input of the module with the access monitoring signal output of the module located upstream of it in the chain, if such a module exists, and since the module located upstream in the chain can constantly receive the access monitoring signal, of binary type, informing it that the link is accessible to it, in the absence of a transmission in progress.

There is nevertheless a so-called risk of collision if several modules simultaneously attempt to transmit after having determined on a separate basis that there was no transmission in progress on the common link. There is therefore provided a procedure, conventionally referred to as a restraining procedure, making it possible to make sure that only one of the modules having simultaneously attempted to go into transmission on the common link will be the source of the collision signal transmitted to all of the modules. This procedure and the means making it possible to implement it at the module level will not be treated herein as it is only indirectly related to the object of the present invention.

The chained auxiliary network solution mentioned above is only suitable when the number of chained modules is limited, since it introduces transmission times for the access monitoring signals which quickly become unacceptable. As an example, we will recall that the IEEE 802.3 standard provides that the delay in the transmission of a packet must be inferior to eight bit times, i.e. 800 nanoseconds, in the most unfavourable case, between two ports, one being the input port and the other the output port, for terminals linked together through a packet transmission link, via modules of repeater type, such as considered above. In addition, the operation of the unit serviced by the chained modules can be seriously disturbed in the case that the chain is interrupted, in the event of the failure or break of a link, for example, as well as in the event of the malfunction or the possible removal of a module.

It is also known to achieve an auxiliary network of control links avoiding the disadvantages mentioned above and making it possible to bypass the restriction in the number of modules caused by the chaining mentioned above. In this case, the access of the modules to a packet transmission link which they have in common is controlled by an external arbitration logic to which the respective inputs and outputs of the access monitoring signals of the different modules are individually linked. There is then no longer a chaining, which eliminates the delays which it caused, but the auxiliary network of control links involves the use of two wires for the access monitoring signals between the arbitrator logic and each of the modules.

But such a solution is not necessarily suitable for all installations since the wiring which it requires may not correspond to the wiring scheme planned for the installation as a whole. This is particularly the case when it is systematically planned to connect all the units of an installation by means of an interconnection network made up of point-to-point type links which are each physically structured and time-controlled according to the requirements of the two units which each of them links. Such a network is then capable of being subdivided into subnetworks respectively made up of point-to-point type links identically structured and controlled, each grouping units communicating in an identical manner. It includes, for example, at least one subnetwork of links utilized in packet mode, as in the previous case. In a known embodiment, a backplane board carrying appropriate point-to-point links then makes it possible to interconnect boards corresponding to units communicating with each other according to one same mode and in particular modules, such as mentioned above, for the control of these modules.

SUMMARY OF THE INVENTION

The invention thus proposes a chaining arrangement between intermediate modules, for a communications installation provided with transceiver terminals communicating by means of a common, digital, packet transmission link, via intermediate modules, particularly of repeater type, each including an input and an output for an access monitoring signal transmitted at the common link enabling one module to block another module to whose input the output of the former is linked, via one of the control links of an auxiliary subnetwork linking the access monitoring signal inputs and outputs of the "n" modules of the installation.

According to one characteristic of the invention, the modules each have their access monitoring signal input linked to the output of a first concentrator logical circuit, this circuit including "p" inputs each capable of being linked to the access monitoring signal output of a different module, "p" being an integer greater than two, and the modules each have their access monitoring signal output linked to a scattering circuit making it possible to simultaneously drive the access monitoring signal inputs of "p" different modules.

According to another characteristic of the invention, a second concentrator logical circuit is inserted between the access monitoring signal output of each module and the scattering circuit specific to this module, this second concentrator logical circuit being linked, through a first input, to the access monitoring signal output of the module considered and, through a second input, to the output of the first concentrator logical circuit of the module.

According to another characteristic of the invention, there is associated to each module a scattering circuit made up of a first switch which is controlled by an installation control unit and which is connected by point-to-point links to the access monitoring signal inputs of all the other modules, and a second switch which is also controlled by said control unit and which links the inputs of the first concentrator logical circuit associated to the module considered to as many individual access monitoring signal outputs of the modules, this second switch being connected by point-to-point control links to the access monitoring outputs of all the other modules.

According to another characteristic of the invention, each module is associated on a carrier board to the two concentrator logical circuits and to the two switches which service it, this board connecting to a backplane board which is particularly intended for receiving other carrier boards communicating according to the same packet mode and which includes the control links intended for making it possible to interconnect the access monitoring signal inputs and outputs of the modules carried by these boards.

According to another characteristic of the invention, each of the modules is simultaneously linked to a number "p" of control links, through the "p" access monitoring signal inputs of the first concentrator logical circuit servicing it, this number "p" being such that each transceiver terminal is linked to any other transceiver terminal of the installation via at least one path for which the transmission time of an access monitoring signal, through the series formed by the modules to which are connected the terminals considered, the control links, the concentrator logical circuits and the switches used, is inferior to the maximum delay admissible for the transmission of a packet between terminals.

Finally, the invention proposes a communications installation including transceiver terminals communicating by means of a common packet transmission link to which they are linked through the intermediate modules, particularly of repeater type, each including an input and an output for an access monitoring signal transmitted at the common link enabling one module to block another module to whose input the output of the former is linked, via one of the control links, of point-to-point type, of an auxiliary subnetwork linking the access monitoring signal inputs and outputs of the modules of the installation. This installation includes a chaining arrangement between modules having at least one of the characteristics mentioned above.

The invention, its characteristics and its advantages are pointed out in the description which follows with reference to the attached drawings, in which:

DETAILED DESCRIPTION OF THE DRAWINGS

DETAILED DESCRIPTION OF THE INVENTION

The chaining arrangement according to the invention is more particularly intended for a communications installation which is capable of including a plurality of constitutive, specialized and modular units which are brought to communicate with each other depending on their respective specialisation and according to the communications services implemented, these units being in particular linked by means of an interconnection network made up of point-to-point type links which are physically structured and time-controlled according to the characteristics of the two units that each of these links specifically link.

Figure 1:
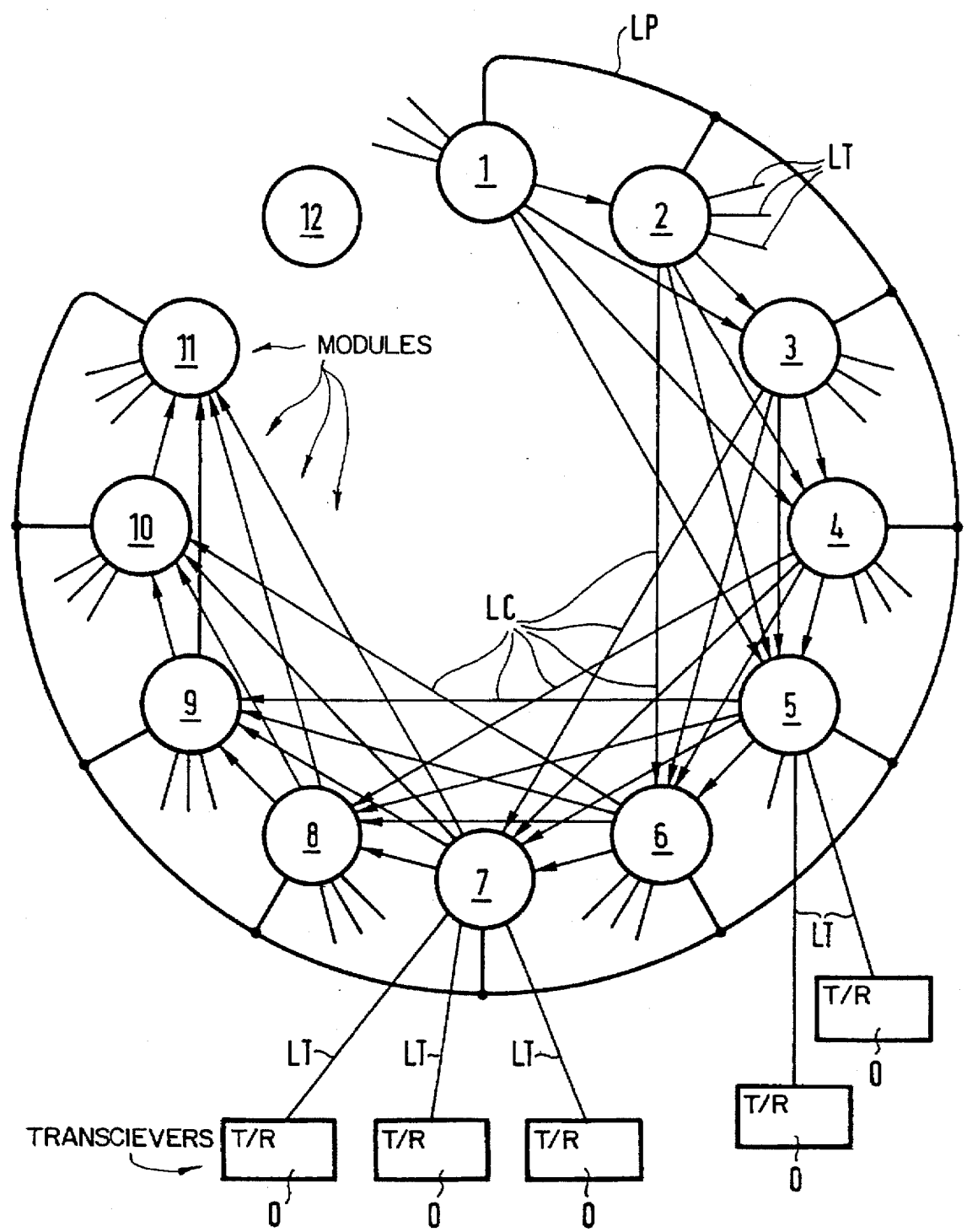
FIG. 1 shows a basic diagram of a communications installation including a chaining arrangement, according to the invention, between modules servicing terminals communicating with each other by means of a common packets transmission link.

This installation thus at least includes transceiver terminals 0 which are intended for communicating with each other by means of a common, digital, packet transmission link LP to which these terminals 0 are linked through modules, referred to as intermediate modules, individually contained within units indicated by reference numerals 1 to 11 in FIG. 1. The "n" units labelled 1 to 11 normally make up only a part of the units of the installation mentioned above, they are linked together through a subnetwork of links LC of point-to-point type in which the links are physically structured and time-controlled in an identical manner, this subnetwork, referred to herein as an auxiliary network, being one of the essential elements of the chaining arrangement according to the invention.

The installation is, of course, capable of including other units, illustrated by a unit indicated by reference numeral 12, and other subnetworks not shown for reasons of simplification. Unit 12 is, for example, a main control unit built around at least one processor and a memory unit.

In the embodiment displayed, the modules contained in units 1 to 11 are of repeater type and correspond, for example, to DP 83950 circuits, referred to as RIC, manufactured by NATIONAL SEMICONDUCTOR. They are monitored by control arrangements 19 in the units which comprise them. Each control arrangement 19 which is not fully detailed in FIG. 2, where it is shown, being built around a microprocessor to which is associated a set of memories, not shown, this microprocessor communicating through an appropriate interface with the repeater which it monitors.

It is assumed that the module of each of the units 1 to 11 includes an input and an output for an access monitoring signal transmitted at the common packet transmission link LP, the access monitoring signals, here assumed to be of binary logical type, being intended for being conveyed between the modules through the links LC, referred to herein as control links, of the auxiliary subnetwork interconnecting the module units 1 to 11. As previously indicated, each module is intended for servicing one or more terminals 0 which are directly connected to it by means of links, referred to as LT herein, to enable each of them to communicate with all the other terminals 0 of the installation via the common packets transmission link LP. These other terminals 0 are themselves linked to this common link through modules and via links LT.

As known, the terminals 0 can be of many different types, ranging from a simple subscriber terminal directly or indirectly accessible in packet mode to a server terminal which can be utilized by a large number of users. In a preferred embodiment displayed with reference to FIG. 2, the auxiliary subnetwork made up of the control links LC is achieved in a board 13, referred to as a backplane board, on which boards corresponding, in particular, to the module units 1 to 11 are connected in board positions determined by means of appropriate connectors, known and not shown in the attached drawings.

In this embodiment, the connectors mounted on the backplane board make it possible to connect, point-to-point and with one another, the boards which they respectively receive, particularly via the control links LC of the auxiliary subnetwork mentioned above for module units 1 to 11.

However, in the embodiment considered the connection of each module to the common packets transmission link LP or, more specifically, of each board 1 to 11 carrying such a module, is provided by means of other module board connectors, not shown and assumed herein to be specifically intended for such a common link LP. The latter includes, for example, a link of NRZ data coding bus type, often referred to by the term "INTERRIC" in the case of so-called "RIC" repeater modules, and it also includes, of course, other links shared for handling collisions, for example.

As previously indicated, each module linked to the common link LP includes an input and an output for an access monitoring signal transmitted at this link, it being understood that the latter can only receive a transmission from a single terminal 0 and therefore via a single module at a time and that, on the other hand, all of the modules receive in an identical manner any transmission transmitted through the common link LP.

Figure 2:
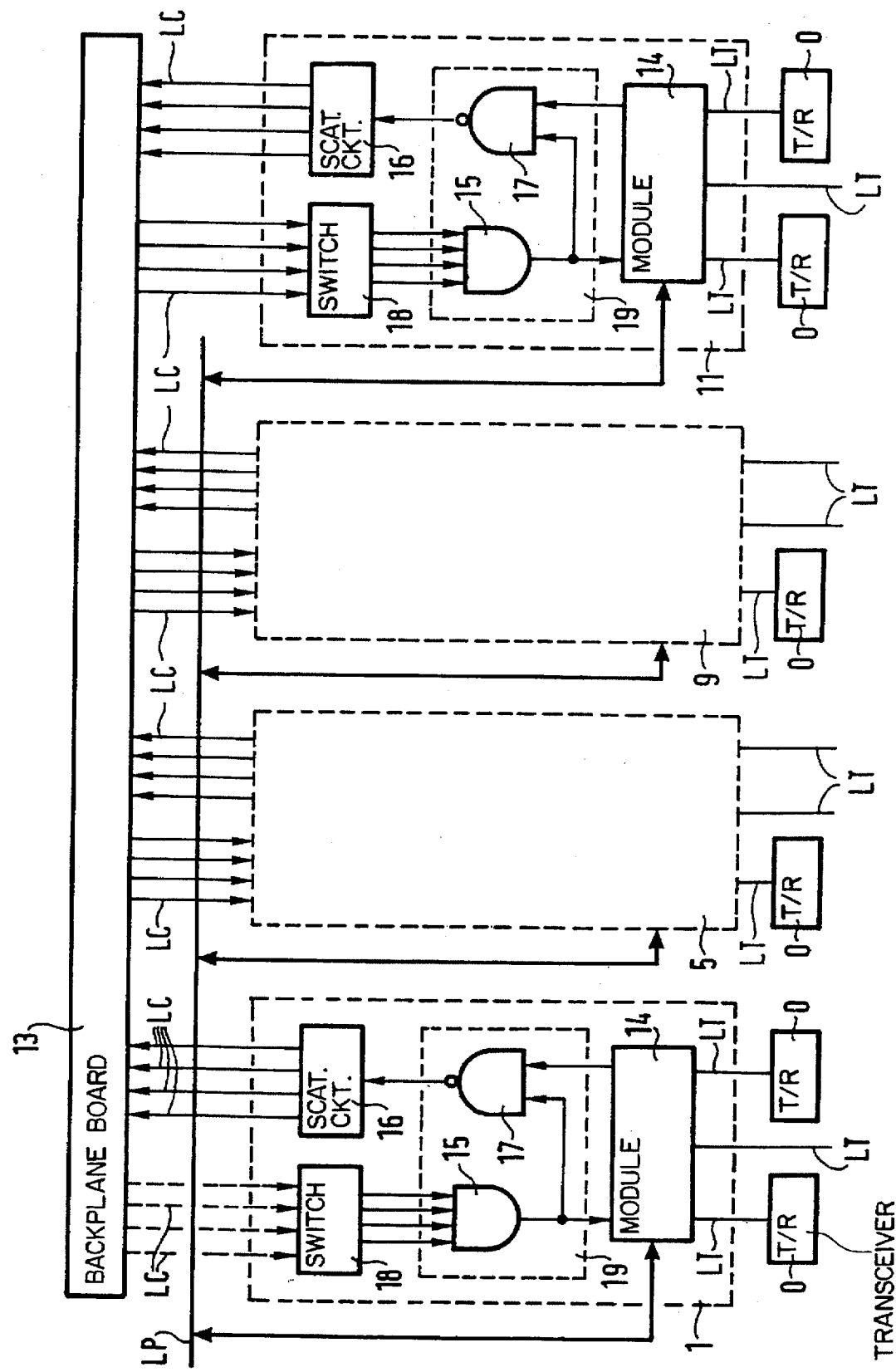
FIG. 2 shows a partial diagram of an exemplary arrangement according to the invention.

In the exemplary embodiment more particularly considered with reference to FIG. 2, each module, indicated by the same reference numeral 14 in units 1 and 11, which is for example of the repeater type previously mentioned, is linked at its access monitoring signal input, referred to herein as "acki", to the output of a first concentrator logical circuit 15. The latter is here assumed to be achieved by means of an AND type gate and it is provided with a number "p" of inputs assumed to be equal to four in FIG. 2. its purpose is to transmit at its output the access monitoring signal transmitted through its "acko" output by a module having to transmit, when the latter is linked to one of the "p" inputs of this first logical circuit 15 through one or more successive control links LC, this signal here being supposedly of low binary level.

Each of the "p" inputs of each first logical circuit 15 associated to a module 14 in a module unit is provided linked to one end of a link LC different from the auxiliary subnetwork carried by the backplane board. Furthermore, each module 14, as mentioned above with reference to FIG. 2, is linked through its access monitoring signal output referred to herein as "acko" to a scattering circuit 16 of the unit containing the module 14 considered. Each scattering circuit 16 is, for example, made up of a switch of the usual type making it possible to link the "acko" output of the module 14 to which it is connected to "p" control links LC of the auxiliary subnetwork so as to be able to act upon the access monitoring signal input of "p" different modules simultaneously.

In a preferred embodiment, a second concentrator logical circuit 17 is inserted between the "acko" access monitoring signal output of each module 14 and the scattering circuit 16 which services it specifically. This second logical circuit 17 is here assumed to be achieved by means of a NAND type gate linked through a first input to the "acko" output of the module 14 considered and through a second input to the output of the first logical circuit 15 which drives the "acki" access monitoring signal input of this same module, so as to enable the scattering of the access monitoring signal which it receives from a module having to transmit which is either the module to which it is linked through its second input or a module to which it is linked via its first input. The fact that the first input of a second concentrator logical circuit is linked to the output of the first concentrator logical circuit associated to the same module makes it possible to transmit the access monitoring signal, here supposedly of low level, which short-circuits the module associated to the two logical circuits considered and which thus makes it possible to avoid the addition of the transmission time which this module would introduce to the duration of the transfer of the access monitoring signal to the various modules of the chaining arrangement, this subject being treated further on.

In a preferred embodiment, a switch 18 is inserted between the inputs of the first logical circuit 15 associated to a module 14 on a module unit board and the control links LC carried by the backplane board 13 which connect, point-to-point, the module unit boards, here indicated by reference numerals 1 to 11, via the connectors, not shown, ensuring their respective connections.

To achieve a chained transmission of the access monitoring signal through the units, it is planned that certain inputs of the first logical circuit of the "p" units considered at the head of the chain be made inefficient, these inputs being selected according to the configuration of the chaining arrangement achieved.

Thus, in the example displayed in FIG. 1, it is considered on principle that the unit 1, located at the head of the chain, does not need to receive an access monitoring signal coming from a unit located upstream.

As a result, the level of the binary signals applied in a permanent manner to the inputs of the first logical circuit, not shown in FIG. 1, of this head-of-the-chain unit is fixed so as to maintain the output of this circuit at a level which inhibits it from blocking either the module at the "acki" access monitoring signal input to which it is directly connected or those of the modules which it can access by means of the second logical circuit of its unit at an input to which it is also directly connected.

For the same reason, the first logical circuit of the unit 2, located immediately downstream of the unit 1 in the chain shown in FIG. 1, can only receive an access monitoring signal through its input which is linked to this single unit 1 located upstream and it must therefore have its other inputs brought to a binary level which makes them inefficient, like those of the first logical circuit of the unit 1. Also for the same reason, in this same case considered in figure 1, the first logical circuit, not shown, of the unit 3 and that of the unit 4, can only respectively receive an access monitoring signal through their respective inputs which are linked to a unit located upstream and their other inputs are therefore made inefficient as indicated above.

Furthermore, the switch 18 and the switch making up the scattering circuit 16 for one same module are here supposedly on the board of the unit including this module. It is, for example, planned that all of the switches associated to the modules on the unit boards be controlled by the microcontrollers of the control arrangements 19 of the units which include them, according to the orders established in a centralized manner, for example, by the main control unit 12 mentioned above.

As previously indicated, the backplane board 13 connects all of the module unit boards together point-to-point by means of the auxiliary subnetwork of control links LC. It is therefore possible to establish and to modify, upon request, by means of the main control unit 12 and the microcontrollers of the control arrangements 19, the connections between the "p" inputs of a concentrator logical circuit 15 and "p" of the control links LC which are established between the module board carrying this circuit and the other module boards, it being understood that the transmission of the access monitoring signal of a module 14 having to transmit towards the other modules 14 does not imply that all of the possible control links LC between module boards be utilized. The establishment of the connections between the concentrator logical circuit 17 and "p" of the control links LC established between the board carrying this circuit and the other module boards can, of course, be achieved in a similar manner by means of the main control unit 12.

In the example displayed in FIG. 2, each module is supposedly directly linked through its access monitoring signal output to four access monitoring signal inputs relating to as many different modules, via its scattering circuit and one point-to-point link LC per input reached.

The transmission time for an access monitoring signal between two modules considered as the transmitter and the receiver, respectively, depends on the transmission times of this signal through the various constitutive elements through which this signal passes from this transmitter module to this receiver module.

It is therefore possible, depending on the number and the nature of these constitutive elements, to transmit a signal through serial control links LC if the sum of the transmission times through the constitutive elements passed remains inferior to an admissible limit, this limit being, for example, 800 nanoseconds in the case mentioned in the preamble to this application.

This makes it possible, for example, to transmit the access monitoring signals via one to three serial control links LC to one same module. In the case of FIG. 1, the module considered as the repeater of one of these units, illustrated by unit 11, for example, is thus capable of directly receiving an access monitoring signal from each unit module, linked to its access monitoring signal input, as illustrated by the links LC displaying arrows directed towards this unit 11 from the units 7, 8, 9 and 10. This same unit module 11 can also receive the access monitoring signal coming from one of the units linked to the access monitoring input of one of the units 7, 8, 9 and 10, such as units 3, 4, 5, 6, 8, it being understood that at this stage there are alternative paths making it possible to transmit an access monitoring signal to the unit 11 via two serial control links LC, from the unit 3 via the units 7 and 9, or from the unit 6 via the units 7 and 10, for example. The existence of alternative paths making use of links provided between different modules makes it possible to avoid that the scattering of an access monitoring signal towards the other modules of the chained arrangement be totally interrupted in case of failure or elimination of one of the constitutive elements placed on a path, and particularly in case of removal or shutdown of a unit board.

The control of the switches 16 and 18 of the module units by means of the control unit 12 makes it possible to carry out a reconfiguration, partial or complete, or the chaining arrangement, if necessary.

However, depending on the number of units chosen, it can be necessary to provide the possibility of transmitting an access monitoring signal by means of more than two serial control links to enable any module to send an access monitoring signal to the others. Such a disposition is considered in the chaining arrangement illustrated in FIG. 1, wherein to make it possible to reach the unit module 11 from the unit 1, it is necessary for the access monitoring signal to make use of three serial control links LC, these links displaying arrows in FIG. 1 connecting, for example, the unit 1 to the unit 11 via the units 5 and 9 or 3 and 7. For the reasons of safety already mentioned above, the configuration is such that two distinct paths make it possible to link any unit to any other unit located downstream in the chain, with the exception of the first one downstream from it, these paths always passing through different intermediate units, when such intermediate units are involved. Thus, in the example provided above, the two paths linking the unit 1 to the unit 11 pass through the units 5 and 9, and through the units 3 and 7, respectively.

Depending on the number of modules and depending on the constraints imposed, it is therefore possible to achieve chaining arrangements between modules which include an auxiliary subnetwork of control links LC wherein each module is linked to any other module via at least two access monitoring signal transmission paths so as to eliminate the risk of a simultaneous transmission of data packets by different modules on the packet transmission link LP shared by the modules.

We claim:

1. A chaining arrangement between intermediate modules, for a communications installation provided with transceiver terminals (0) communicating by means of a common, digital, packet transmission link (LP), via intermediate modules (14), each including an input (acki) and an output (acko) for an access monitoring signal transmitted at the common link enabling one module to block another module to whose input the output of the former is linked, via one of the control links (LC), of point-to-point type, of an auxiliary subnetwork linking the access monitoring signal inputs and outputs of the "n" modules of the installation, the chaining arrangement being characterised in that the modules each have their access monitoring signal input linked to the output of a first concentrator logical circuit (15), this circuit including "P" inputs each capable of being linked to the access monitoring signal output of a different module, "p" being an integer greater than two, and in that the modules each have their access monitoring signal output linked to a scattering circuit

(16) making it possible to simultaneously drive the access monitoring signal inputs of "p" different modules.

2. A chaining arrangement according to claim 1, characterised in that a second concentrator logical circuit (17) is inserted between the access monitoring signal output of each module and the scattering circuit specific to this module, this second concentrator logical circuit being linked, through a first input, to the access monitoring signal output of the module considered and, through a second input, to the output of the first concentrator logical circuit (15) of the module.

3. A chaining arrangement according to claim 1, characterised in that there is associated to each module a scattering circuit (16) made up of a first switch which is controlled by an installation control unit (12) and which is connected by point-to-point links to the access monitoring signal inputs of all the other modules, and a second switch (18) which is also controlled by said control unit and which links the inputs of the first concentrator logical circuit (15) associated to the module considered to as many individual access monitoring signal outputs of the modules, this second switch being connected by point-to-point control links to the access monitoring outputs of all the other modules.

4. A chaining arrangement according to claim 1, characterised in that each module (14) is associated on a carrier board (1 to 11) to the two concentrator logical circuits (15 and 17) and to the two switches (16 and 18) which service it, this board connecting to a backplane board (13) which is particularly intended for receiving other carrier boards communicating according to the same packet mode and which includes the control links (LC) intended for making it possible to interconnect the access monitoring signal inputs and outputs of the modules carried by these boards.

5. A chaining arrangement according to claim 1, characterised in that each of the modules (14) is simultaneously linked to a number "p" of control links (LC), through the "p" access monitoring signal inputs of the first concentrator logical circuit (15) servicing it, this number "p" being such that each transceiver terminal is linked to any other transceiver terminal of the installation via at least one path for which the transmission time of an access monitoring signal, through the series formed by the modules to which are connected the terminals considered, the control links, the concentrator logical circuits and the switches used, is inferior to the maximum delay admissible for the transmission of a packet between terminals.

6. A communications installation including transceiver terminals (0) communicating by means of a common packet transmission link (LP) to which they are linked through the intermediate modules, each including an input (acki) and an output (acko) for an access monitoring signal transmitted at the common link enabling one module to block another module to whose input the output of the former is linked, via one of the control links (LC), of point-to-point type, of an auxiliary subnetwork linking the access monitoring signal inputs and outputs of the "n" modules of the installation, characterised in that it includes a chaining arrangement between modules according to at least one of claim 1.

* * * * *